(12) United States Patent  (10) Patent No.: US 8,178,038 B2
Illencik et al.  (45) Date of Patent: May 15, 2012

(54) UNDERCUT CRANKSHAFT HARDENING COIL

(75) Inventors: Tom Illencik, Girard, OH (US); Ronald R. Akers, Guntersville, AL (US); Richard McKelvey, Albertville, AL (US)

(73) Assignee: Ajax Tocco Magnethermic Corporation, Warren, OH (US)

( * ) Notice: Subject to any disclaimer, the term of this patent is extended or adjusted under 35 U.S.C. 154(b) by 474 days.

(21) Appl. No.: 12/484,422

(22) Filed: Jun. 15, 2009

(65) Prior Publication Data

US 2009/0308501 A1 Dec. 17, 2009

Related U.S. Application Data

(60) Provisional application No. 61/061,371, filed on Jun. 13, 2008.

(51) Int. Cl.
*C21D 1/10* (2006.01)

(52) U.S. Cl. .......................... 266/249; 219/672
(58) Field of Classification Search ........... 266/249; 219/672, 639
See application file for complete search history.

(56) References Cited

U.S. PATENT DOCUMENTS

| | | | | |
|---|---|---|---|---|
| 6,153,865 | A * | 11/2000 | Storm et al. ............ | 219/672 |
| 6,362,462 | B1 * | 3/2002 | Merrell et al. ........... | 219/672 |
| 6,399,928 | B1 | 6/2002 | Gezarzick et al. | |
| 7,145,115 | B2 | 12/2006 | Zahn et al. | |

* cited by examiner

*Primary Examiner* — Scott Kastler
(74) *Attorney, Agent, or Firm* — Fay Sharpe LLP

(57) ABSTRACT

Improved induction coil apparatus and methods are presented for induction hardening undercut fillets of crankshafts or other workpiece recesses in which an active turn is energized for heating a journal area in the workpiece recess and one or more passive turns are translated toward undercut fillets once the coil assembly is moved toward the recess with coupling portions of the passive and active turns coupling energy from the active turn to the passive turn(s) for heating the undercut fillets.

20 Claims, 11 Drawing Sheets

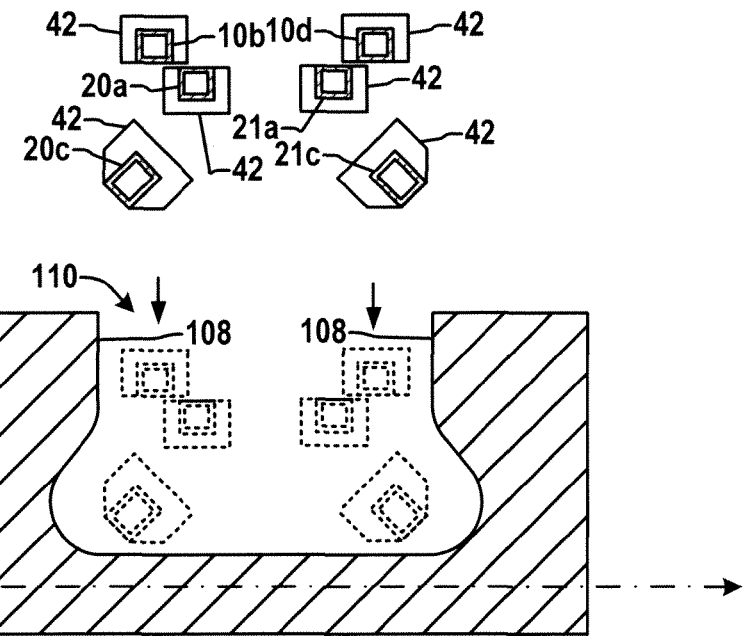
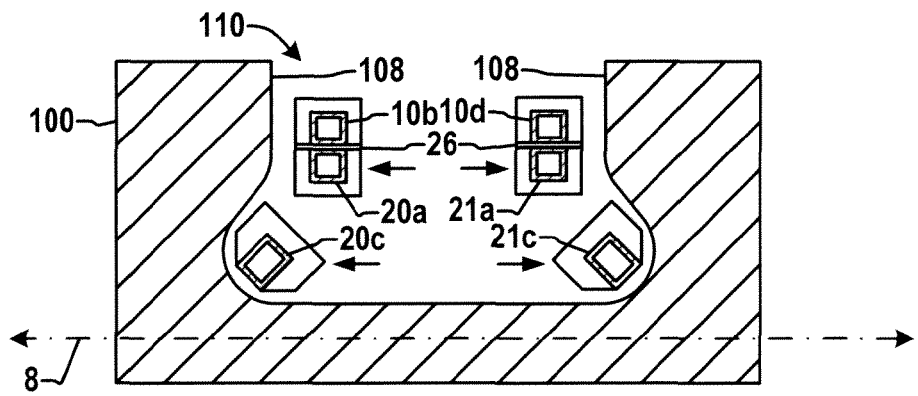
FIG. 7
FIG. 8
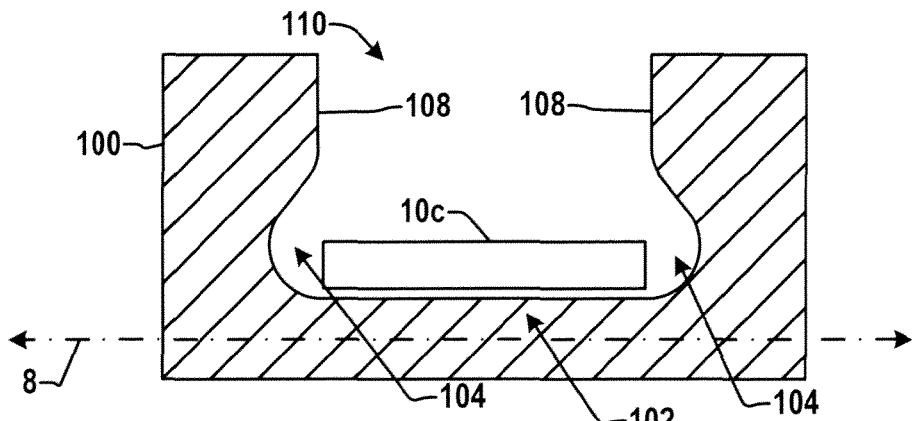
FIG. 9

UNDERCUT CRANKSHAFT HARDENING COIL

REFERENCE TO RELATED APPLICATION

This application claims priority to and the benefit of U.S. Provisional Patent Application Ser. No. 61/061,371, filed Jun. 13, 2008, entitled IMPROVED UNDERCUT CRANKSHAFT HARDENING COIL, the entirety of which is hereby incorporated by reference.

FIELD OF THE INVENTION

The present disclosure relates generally to the induction heating and more particularly to improved undercut crankshaft hardening coil apparatus and methods for hardening undercut crankshafts.

BACKGROUND

Modern large crankshafts for use in locomotives or other high torque applications are often undercut into the side wall, creating a recess. Although this offers an improved crankshaft for the application it presents a difficult challenge to properly heat treat the surface of the undercut. Descriptions of the undercut crankshaft hardening applications are found in U.S. Pat. No. 6,399,928 by Gezarzick et al and U.S. Pat. No. 7,145,115 by Zahn et al., which are incorporated herein by reference. Those disclosures required complex electrical connections and or coil configurations to engage both the undercut fillets and the journal to allow the part to be heated with one continuous process.

SUMMARY

One or more aspects of the disclosure are now summarized to facilitate a basic understanding of the disclosure, wherein this summary is not an extensive overview of the disclosure, and is intended neither to identify certain elements of the disclosure, nor to delineate the scope thereof. The primary purpose of the summary, rather, is to present some concepts of the disclosure in a simplified form prior to the more detailed description that is presented hereinafter. The present disclosure relates to improvements in induction heating coil assemblies and methods for induction hardening undercut fillets which may be employed for hardening crankshafts or other workpieces having recesses with undercut areas. The disclosed apparatus provides an active turn for heating a journal area in the workpiece recess and one or more passive turns which are translated toward undercut fillets after the coil assembly is moved toward the recess with coupling portions of the passive and active turns coupling energy from the active turn to the passive turn(s) for heating the undercut fillets.

In accordance with one or more aspects of the disclosure, an induction coil apparatus is provided, having a coil assembly comprised of an active turn and one or more passive turns. The active turn is coupleable to an electric power source to form a first conductive circuit including one or more active coupling sections and one or more crossover sections. When the assembly is located near a workpiece and energized, the crossover section(s) heat at least a portion of a journal area in a workpiece recess. The passive turn is electrically isolated from the active turn and forms a second conductive circuit including at least one passive coupling section and at least one passive heating section. The passive turn is translatable relative to the active turn between a first position for engaging with or disengaging from the workpiece in which the passive heating section clears a recess sidewall, and a second position in which the passive coupling section is proximate to and electromagnetically coupled with the active coupling section of the active turn and in which the passive heating section is located proximate to an undercut fillet area of the workpiece recess. In the second position, energy from the active turn is electromagnetically coupled to induce current in the passive turn(s) for fillet heating while the journal area is heated by the active turn.

In certain embodiments, the active turn includes a circumferential active heating portion proximate the journal area.

In certain embodiments, the passive turn is translatable relative to the active turn in a direction parallel to a longitudinal axis of the workpiece between the first and second positions.

In certain embodiments, an insulator is disposed between the passive coupling section and the active coupling section.

In certain embodiments, the passive heating section of the passive turn is located at least partially within the undercut fillet area of the workpiece recess in the second position.

Further aspects of the disclosure provide a method for hardening undercut fillets of a workpiece using induction heating. The method includes translating a coil assembly radially toward a recess in the workpiece such that a passive turn of the coil assembly clears a sidewall of the recess and at least one crossover section of an active coil of the coil assembly is proximate a journal area in the workpiece recess, translating the passive turn relative to the active turn such that a passive coupling section of the passive turn is proximate to and electromagnetically coupled with an active coupling section of the active turn and a passive heating section of the passive turn is located at least partially within an undercut fillet area of the workpiece recess, and energizing the active turn with electrical power to heat at least a portion of a journal area in the workpiece recess using the at least one crossover section of the active coil and to induce electrical current in the passive turn to heat at least a portion of the undercut fillet area of the workpiece recess using the passive heating section of the passive turn. In certain implementations, translation of the passive turn relative to the active turn comprises translating the passive turn in a direction parallel to a longitudinal axis of the workpiece.

BRIEF DESCRIPTION OF THE DRAWINGS

The following description and drawings set forth certain illustrative implementations of the disclosure in detail, which are indicative of several exemplary ways in which the principles of the disclosure may be carried out. The illustrated examples, however, are not exhaustive of the many possible embodiments of the disclosure. Other objects, advantages and novel features of the disclosure will be appreciated from the following detailed description of the disclosure when considered in conjunction with the drawings, in which:

FIG. 7 is a simplified partial end elevation view of the coil assembly of FIGS. 1-6 with the passive turns in first retracted positions illustrating insertion of the assembly into a recess of a crankshaft workpiece;

FIG. 8 is a simplified partial end elevation view of the coil assembly of FIGS. 1-7 illustrating the passive turns axially extended to second positions for induction heating of the undercut fillet areas of the workpiece recess;

FIG. 9 is a simplified partial end elevation view of the coil assembly of FIGS. 1-8 illustrating the position of an exemplary crossover portion of the active turn proximate a journal portion of the workpiece recess during induction heating;

DETAILED DESCRIPTION

Figure 1:
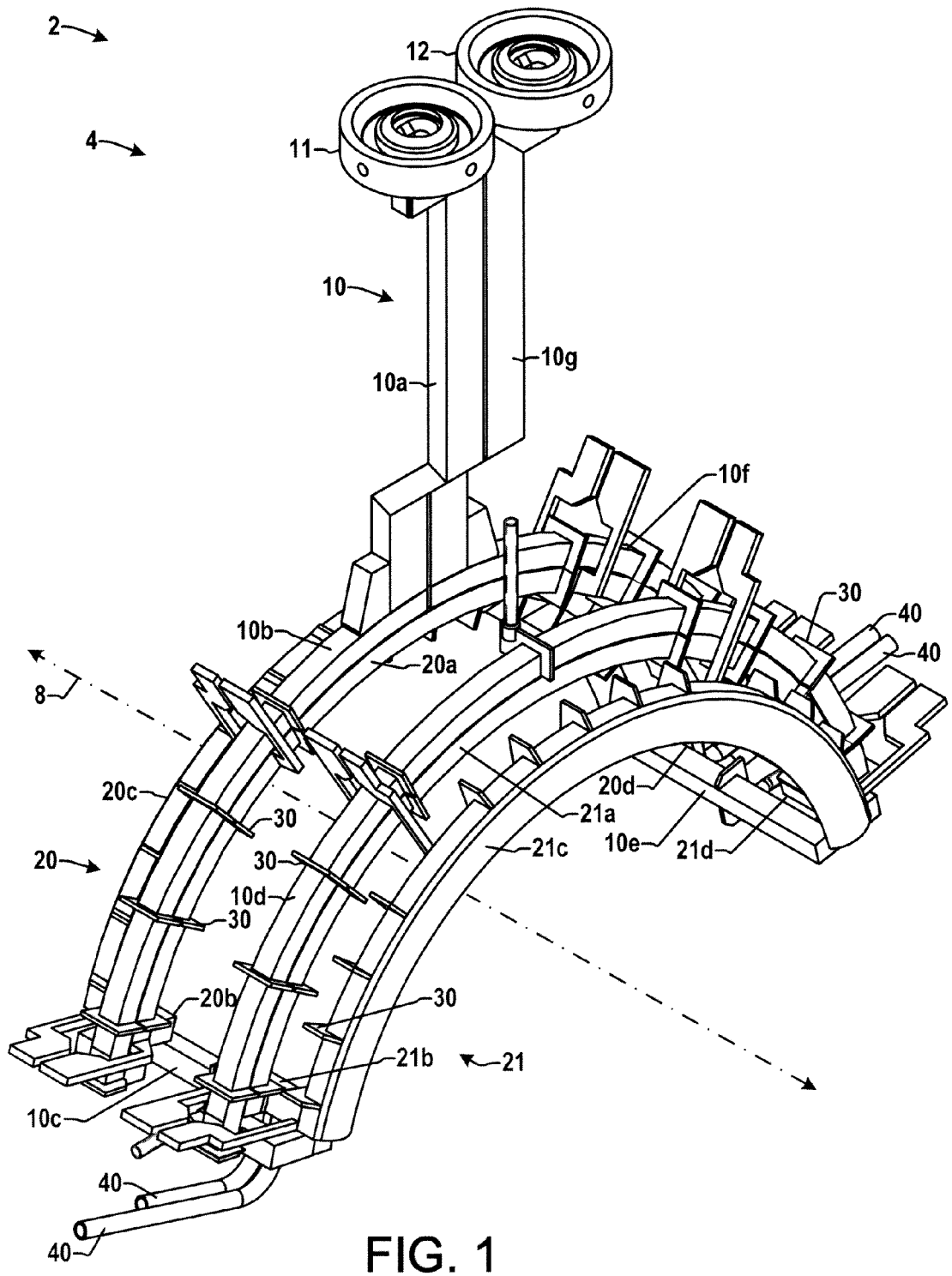
FIGS. 1-4 are partial perspective, side and end elevation, and top plan views illustrating conductor portions of an exemplary coil assembly with an active turn and two passive turns in extended second positions in accordance with one or more aspects of the present disclosure.
Figure 2:
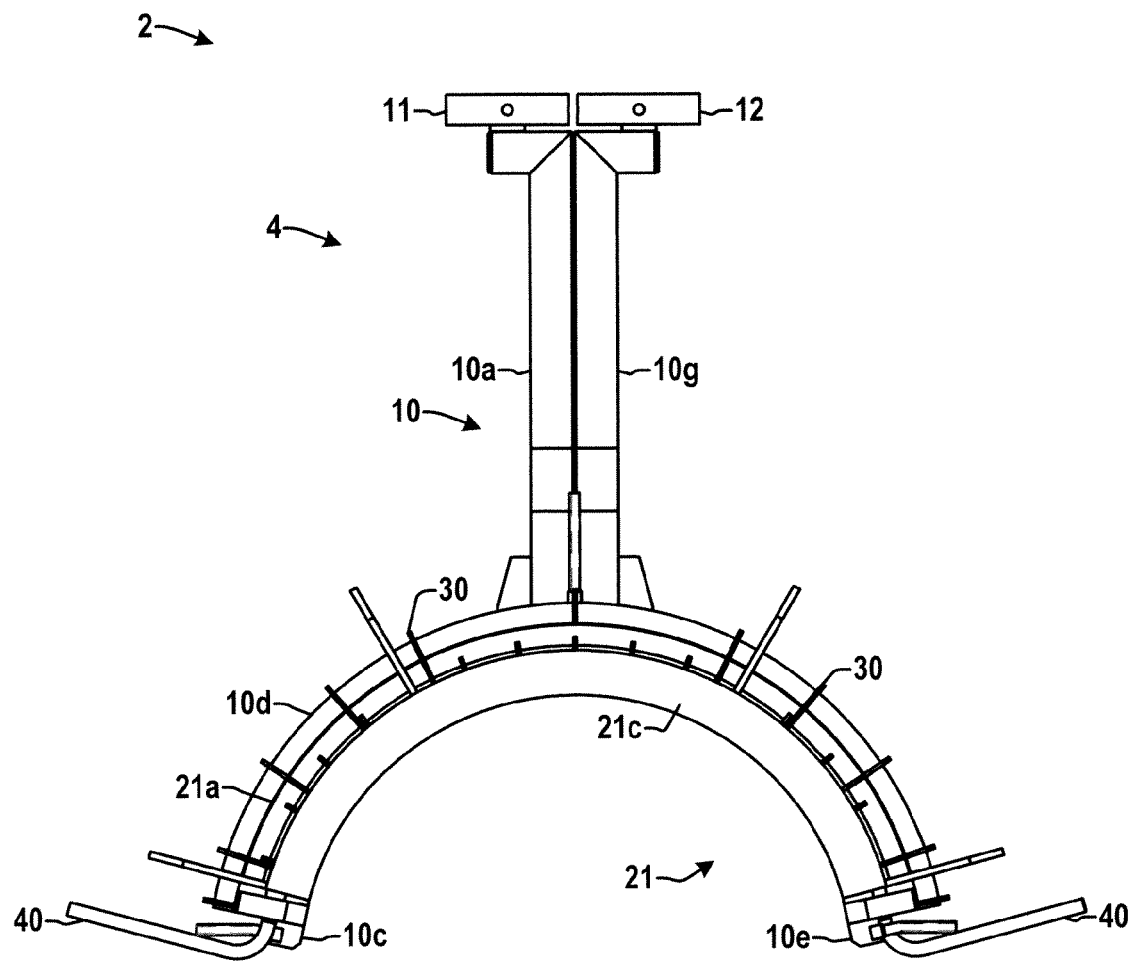
Figure 3:
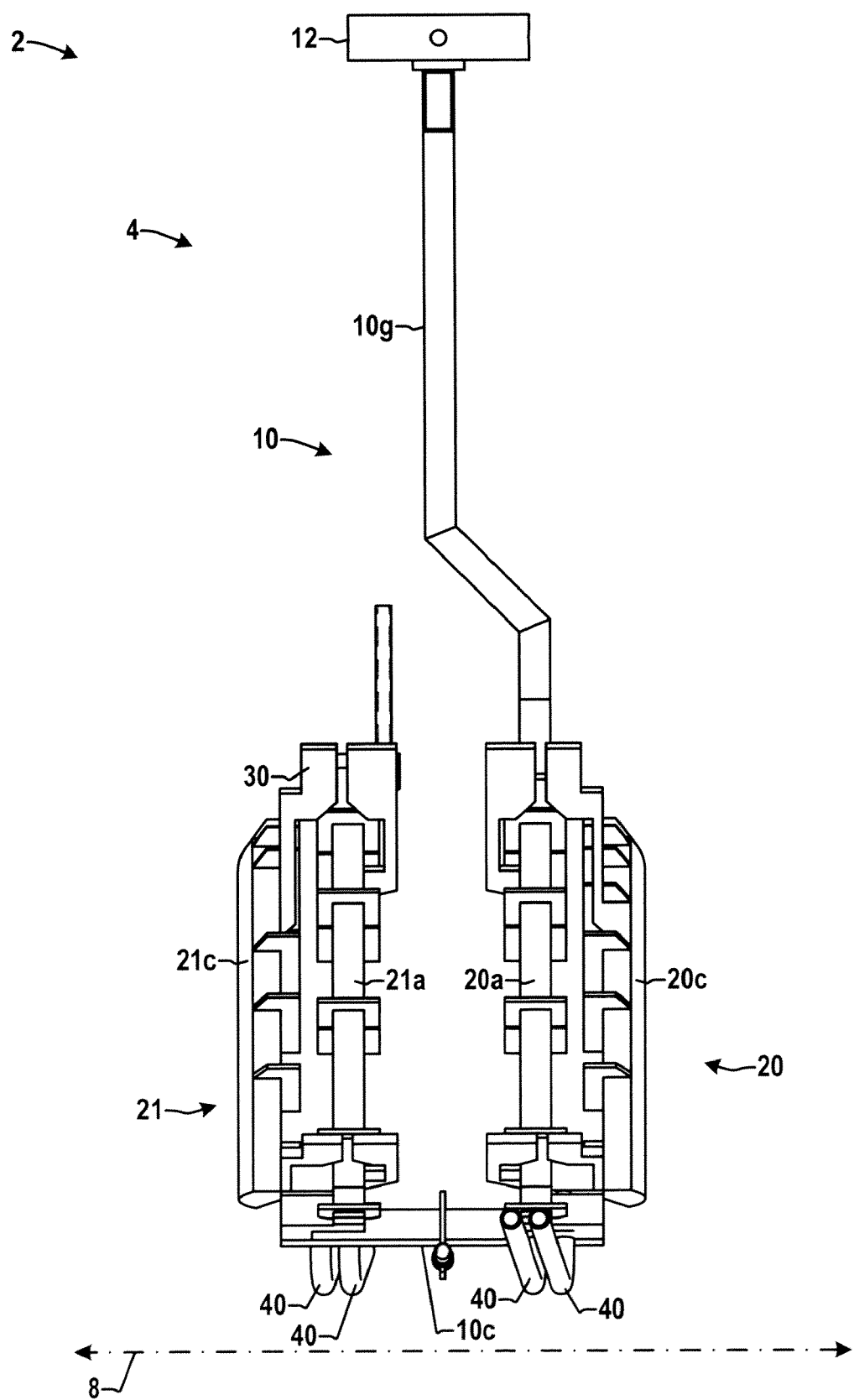
Figure 4:
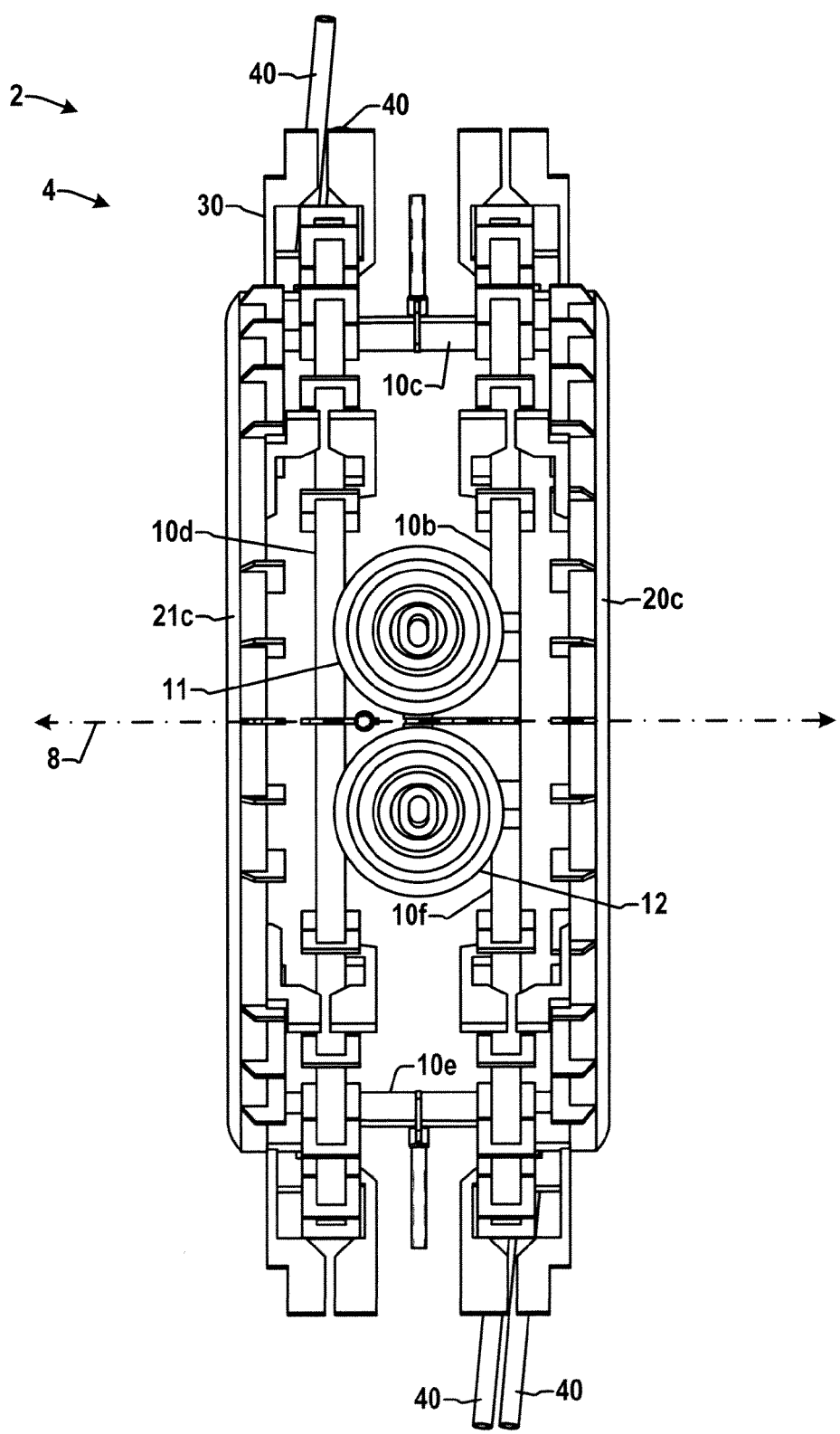
Figure 5:
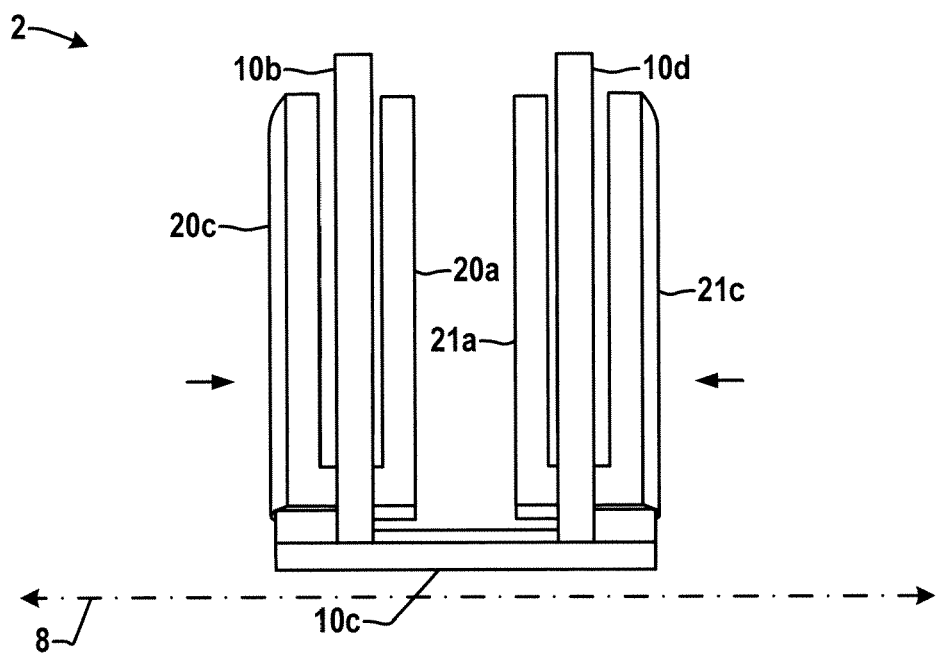
FIG. 5 is a simplified end elevation view of the coil assembly of FIGS. 1-4 illustrating the passive turns in first retracted positions for clearance during radial insertion to or extraction from a workpiece recess.

Referring now to the figures, several embodiments or implementations are hereinafter described in conjunction with the drawings, where like reference numerals are used to refer to like elements throughout, and where the various features are not necessarily drawn to scale. The present disclosure provides apparatus 2 and coil assemblies 4 thereof having an active turn 10 that couples with one or more fillet hardening passive turns 20, 21 and couples with a workpiece journal for hardening the journal 102 and also providing the energy to the two passive turns or coils to harden one or more undercut fillet areas 104 of the workpiece 100. The disclosed approach advantageously locates the active turn crossovers 10c, 10e so as to inductively heat the journal 102, and the active turn 10 can extend around a circumferential portion of the journal by up to about 180 degrees. The active turn 10, moreover, is electrically connected to a power supply to conduct current from the supply for inductively heating the journal 102 via the crossovers. One or more inner passive turns 20, 21 are provided in at least one space within and/or below the active turn 10 in certain embodiments, where the passive turns 20, 21 are passively energized via electromagnetic coupling from the active turn 10 such that the passive turns 20, 21 are not connected to the power supply, where the passive turns 20, 21 each form a closed loop structure. A coupling portion 20a, 21a of each passive turn 20, 21 is proximate the circumferential and/or other coupling portion 10b, 10f, 10d of the active turn 10 so as to electromagnetically couple therewith, and a second portion 20c, 21c of the passive turn 20, 21 is extendable at least partially into an undercut of a fillet 104 for heating thereof. In certain journal portions 104 of a crankshaft workpiece 100 having two undercut fillets 104 at two axially spaced sides of the journal 102, each side can have one or more passive heating turns or turn portions for heating the associated fillet 104, with the passive turns 20, 21 of each side being axially movable at least partially into the undercut fillet areas 104 after radial approach of the coil arrangement 2 to or proximate the journal 102.

Referring initially to FIGS. 1-11, an exemplary induction coil apparatus 2 is illustrated, which may be advantageously employed for hardening undercut fillets 104 of a crankshaft or other workpiece 100. One embodiment is best shown in FIGS. 1-4, where the apparatus 2 has a coil assembly 4 including an active turn or coil 10 and two passive turns or coils 20 and 21. The active turn 10 is coupleable using conductive couplings 11 and 12 to an electric power source to form a first conductive circuit therewith, where the active turn is formed of hollow copper tube structures to provide an internal fluidic path for circulation of coolant during operation via the couplings 11 and 12. Likewise, the first and second passive turns 20 and 21 are formed of conductive (e.g., copper) tubes providing internal coolant passageways for coolant circulated via coolant couplings 40. The active turn 10 of FIGS. 1-11 is formed of sections 10a-10g including active coupling section 10b, a first active crossover section 10c, a second active coupling section 10d, a second crossover section 10e, another partial coupling portion 10f and a final portion 10g, where the crossover sections 10c and 10e are operative to heat all or a portion of the workpiece journal area 102 in a recess 110 thereof when the coil assembly 4 is positioned at or near the workpiece 100, as shown in FIG. 9.

Figure 10:
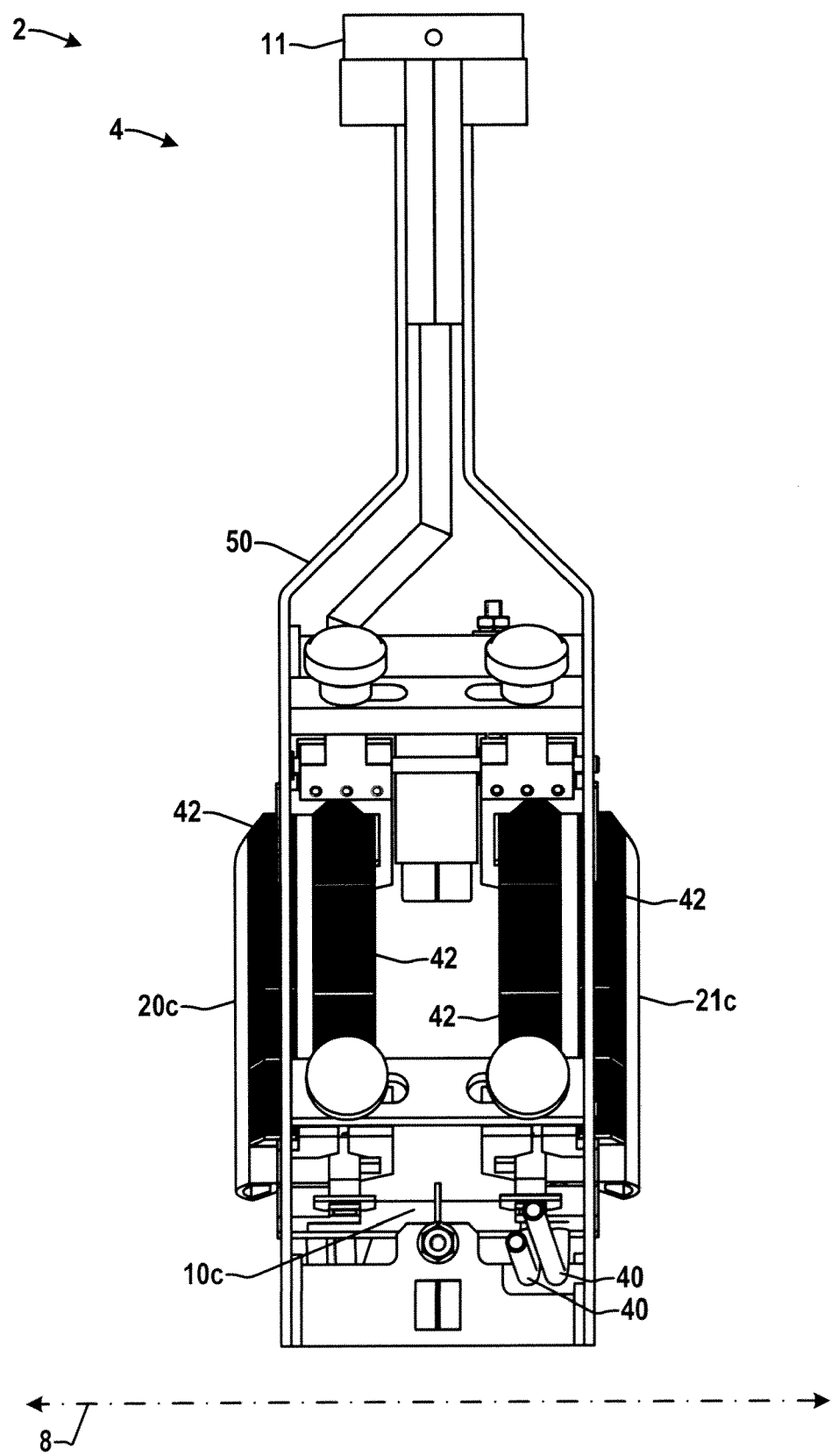
FIGS. 10 and 11 are partial side and end elevation views of the coil assembly of FIGS. 1-9 illustrating magnetic laminations installed for electromagnetic coupling and further details of an exemplary support structure.
Figure 11:
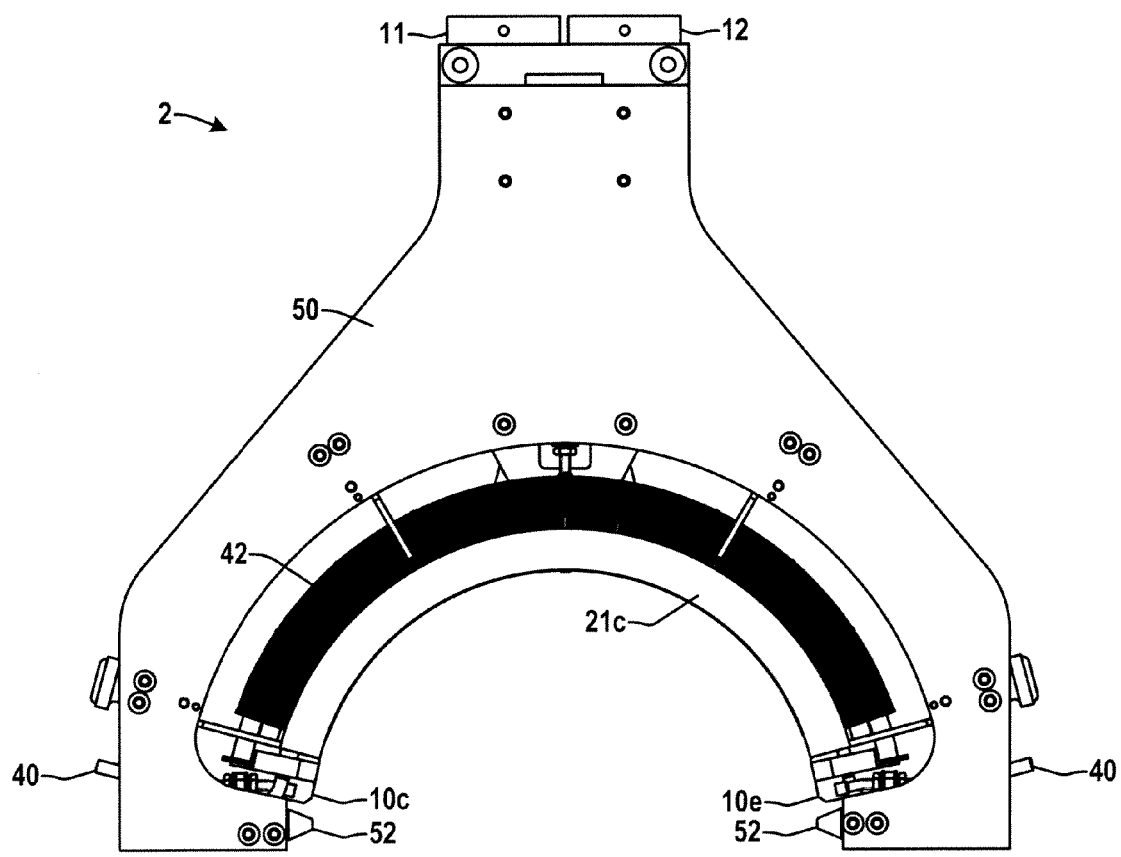
Figure 12:
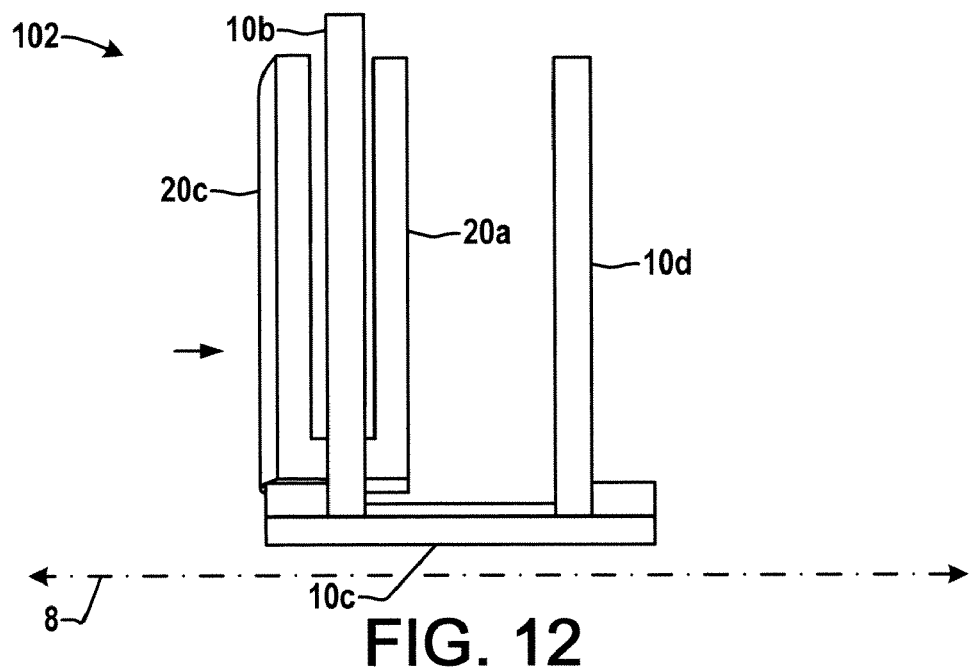
FIG. 12 is a simplified end elevation view of another exemplary embodiment of the coil assembly with a single passive turn in a first retracted position for clearance during radial insertion to or extraction from a workpiece recess for heating single undercut fillets.
Figure 13:
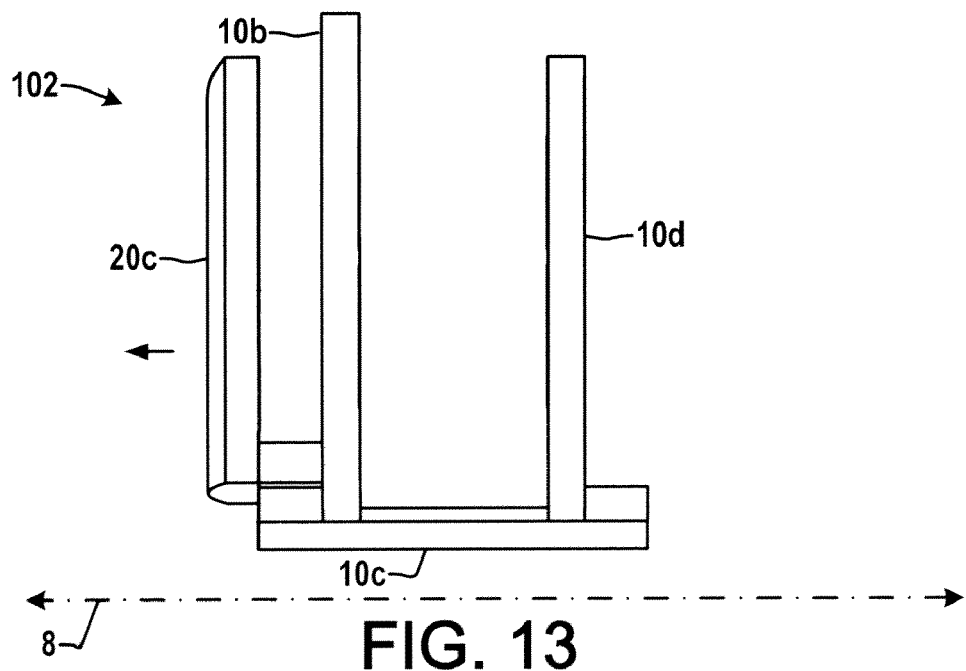
FIG. 13 is a simplified end elevation view of the coil assembly embodiment of FIG. 12 illustrating the passive turn in a second extended position for undercut fillet heating.
Figure 14:
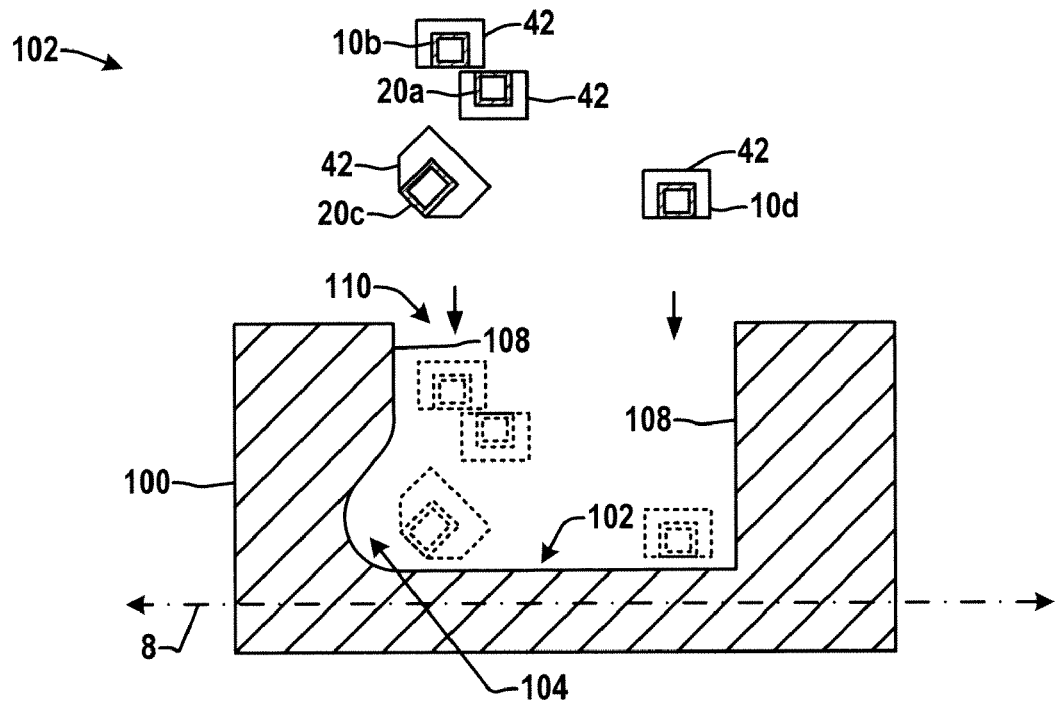
FIG. 14 is a simplified partial end elevation view of the coil assembly of FIGS. 12 and 13 with the passive turn in the first retracted position illustrating insertion of the assembly into a recess of a crankshaft workpiece.
Figure 15:
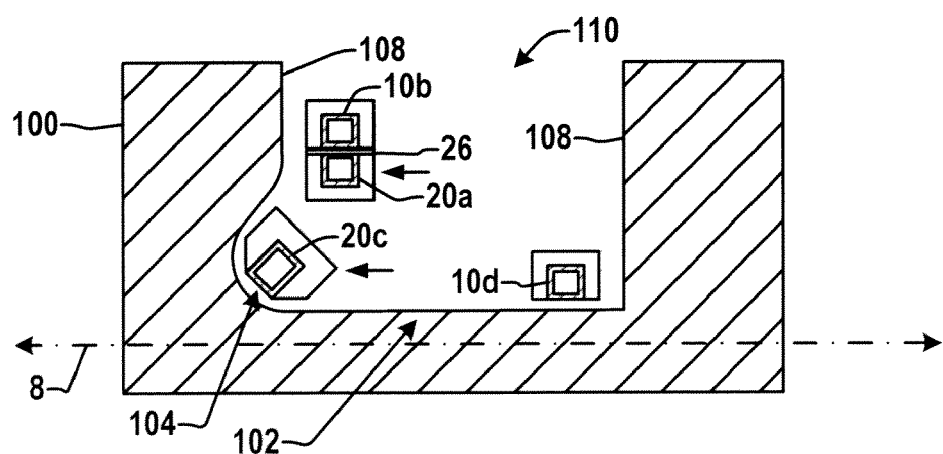
FIG. 15 is a simplified partial end elevation view of the coil assembly embodiment of FIGS. 12-14 illustrating the passive turn axially extended to a second position for induction heating of the undercut fillet area of the workpiece recess.

The first passive turn 20 is electrically isolated from the active turn 10 and forms a closed conductive circuit including a circumferential coupling section 20a, a crossover portion 20b, a passive heating section 20c, and a second crossover portion 20d connecting back to the coupling portion 20a. Similarly, the second passive turn 21 forms a closed conductive circuit electrically isolated from the active turn 10 via coupling section 21a, crossover sections 21b and 21d and an outlying heating section 21c, and the passive turns 20 and 21 are separately cooled by fluid provided via tubes 40. The active and passive turns 10, 20, and 21 are fitted with lamination keeper structures 30 for laminations 42 (FIGS. 10 and 11) for electromagnetic coupling of the active turn 10 with the passive turns 20 and 21, where any suitable magnetic material may be used for the laminations 42, such as iron in one embodiment. Other embodiments are possible using suitable magnetic material to form flux concentrator structures 42, which need not be laminations. As shown in FIGS. 10 and 11, moreover, the coil apparatus 2 further includes protective outer covers 50 and may include other suitable mounting and support structures for translation operation as described herein.

Figure 6:
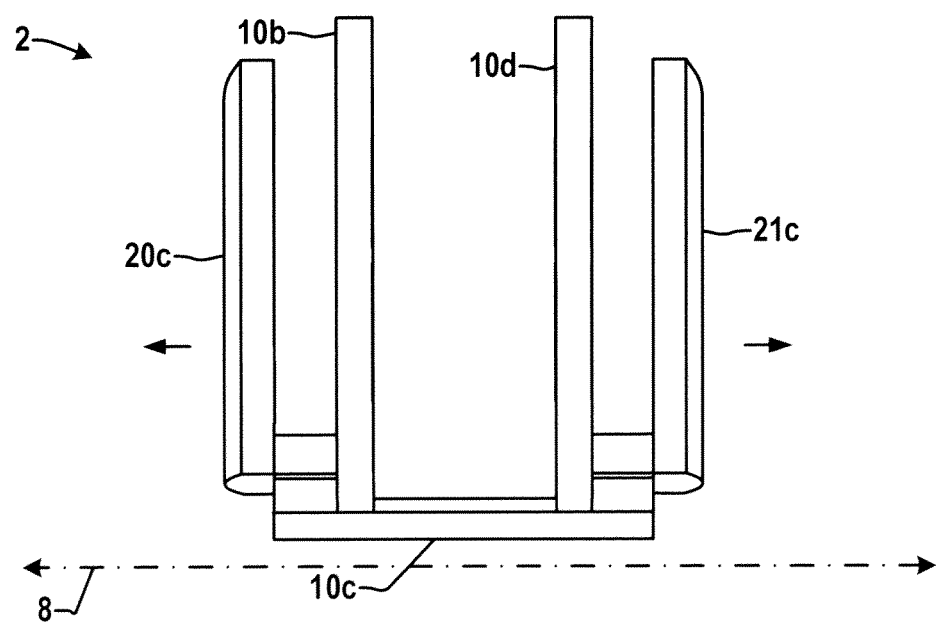
FIG. 6 is a simplified end elevation view of the coil assembly of FIGS. 1-5 illustrating the passive turns in second extended positions for undercut fillet heating.

Referring also to FIGS. 5-9, the passive turns 20 and 21 are translatable by any suitable mechanical translation devices (not shown) relative to the active turn 10 between a first position (FIGS. 5 and 7) in which the passive heating sections 20c and 21c clear sidewalls 108 of a workpiece recess 110 as the coil assembly 4 is translated radially toward the recess 110 (FIG. 7) and a second position (FIGS. 6 and 8 in which the passive coupling sections 20a, 21a are proximate to and electromagnetically coupled with the first active coupling section 10b, 10f, 10d of the active turn 10. As shown in FIG. 8, moreover, an insulator 26 may be provided in certain embodiments between the passive coupling section 20a and the active coupling section 10b, 10f, as well as between the active coupling section 10d and the passive coupling section 21a of the second passive turn 21, which may be any suitable insulator material, such as Teflon in one example. In the second positions, moreover, the first passive heating section 20c is located at least partially within a first undercut fillet area 104 of the workpiece recess 110, and the second passive heating section 21c is located at least partially within a second undercut fillet area 104 of the workpiece recess 110, as illustrated in FIG. 8. In addition, as shown in FIG. 9, the active turn crossover portions 10c and 10e are disposed to be proximate the workpiece journal portion 102 during induction heating when the apparatus 2 is translated toward the recess 110.

In the embodiment of FIG. 8, the first passive turn 20 is translatable relative to the active turn 10 in a first direction (to the left in the figure) generally parallel to a longitudinal workpiece axis 8 between the first and second positions, and the second passive turn 21 is translatable in a generally opposite axial direction (to the right) between its first and second positions, where any suitable mechanism(s) can be used to provide the translation of the passive turns 20, 21 relative to the active turn 10.

The current in the closely coupled fillet hardening active turns 20, 21 will be equal (except for leakage flux) and opposite to the current in the main active turn 10 in the illustrated embodiments. As a result, the current in the fillet hardening portions 20c and 21c is in the same direction as the main driving current of the active turn 10, and the current induced in the fillets 104 is in the same direction as the main journal hardening current of the active turn crossover portions 10c and 10e so that the net electromagnetic configuration is that of a standard crankshaft hardening coil. With this arrangement, the fillet hardening passive sections 20c and 21c can be freely moved, at least partially, into and out of the fillet without any external electrical connection. As shown in FIG. 11, moreover, bumpers or guides 52 may be provided in the apparatus 2 for locating the apparatus 2 relative to a workpiece 100, which will generally be rotated about the axis 8 during heating with the active turn 10 energized. In addition, the apparatus and the coil assembly 4 thereof may extend any circumferential distance about the workpiece 100, such as about 180 degrees or less in various embodiments.

Figure 16:
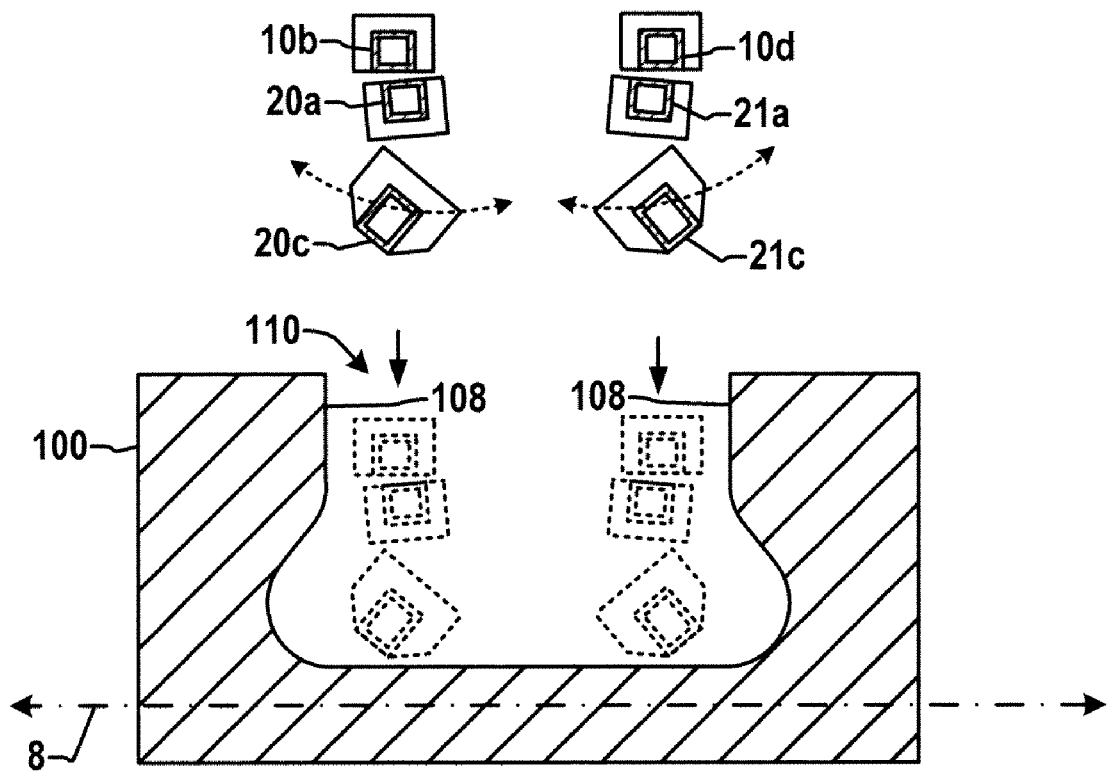
FIGS. 16 and 17 are partial end elevation views illustrating another coil assembly embodiment in which the passive turns are pivotally translatable between first retracted positions for insertion or removal and second extended positions for undercut fillet heating in accordance with the disclosure.
Figure 17:
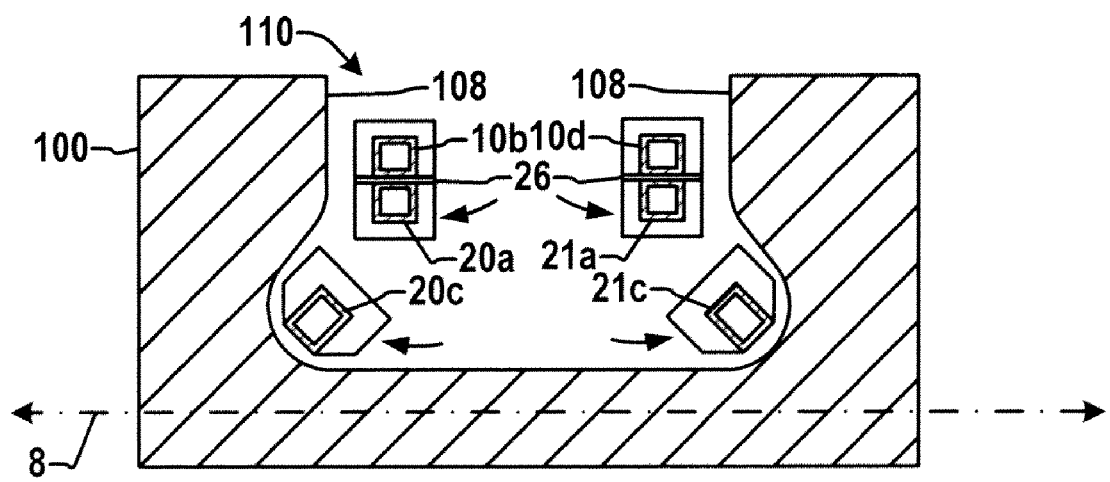

Referring now to FIGS. 16 and 17, the translation of the passive turns 20 and 21 need not be strictly parallel to the workpiece axis 8. In the embodiment of FIGS. 16 and 17, the passive turns 20 and 21 are pivotally translatable between first retracted positions for insertion or removal of the apparatus 2 while clearing the sidewalls 108 (FIG. 16), and second extended positions for undercut fillet heating (FIG. 17).

Referring now to FIGS. 12-15, another exemplary embodiment of the coil assembly 4 is illustrated, having a single passive turn 20 configured generally as described above, along with an active turn 10 similar to that shown in the above figures, but with the section 10d being lowered to be proximate the journal 102, such as approximately the same proximity as turn 20c, in order to force the current to return through the journal 102. This embodiment may be employed for hardening recesses 110 having only one undercut fillet 104, which is heated via the translatable passive turn portion 20c, while the journal 102 is heated via the active turn 10 as described in the above embodiments.

The above described apparatus 2 is particularly suitable for various induction heating processes. The disclosure provides an exemplary process for hardening undercut fillets 104 of a workpiece 100, which may employ the described apparatus 2 or which may be used in conjunction with other apparatus. The process includes translating a coil assembly 4 radially toward a recess 110 in the workpiece 100 such that a passive turn 20 of the coil assembly 4 clears a sidewall 108 of the recess 110 and at least one crossover section 10c, 10e of an active coil 10 of the coil assembly 4 is proximate a journal area 102 in the workpiece recess 110. The process also includes translating the passive turn 20 relative to the active turn 10 such that a passive coupling section 20a of the passive turn 20 is proximate to and electromagnetically coupled with an active coupling section 10b, 10f of the active turn 10 and a passive heating section 20c of the passive turn 20 is located at least partially within an undercut fillet area 104 of the workpiece recess 110, and energizing the active turn 10 with electrical power to heat at least a portion of a journal area 102 in the workpiece recess 110 using the at least one crossover section 10c, 10e of the active coil 10 and to induce electrical current in the passive turn 20 to heat at least a portion of the undercut fillet area 104 of the workpiece recess 110 using the passive heating section 20c of the passive turn 20. In certain embodiments, the translation of the passive turn 20 relative to the active turn 10 comprises translating the passive turn 20 in a direction parallel to a longitudinal axis 8 of the workpiece 100.

The above examples are merely illustrative of several possible embodiments of various aspects of the present disclosure, where equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. An induction coil apparatus for hardening undercut fillets of a workpiece, the apparatus comprising:
   a coil assembly comprising:
   an active turn coupleable to an electric power source to form a first conductive circuit, the active turn having at least one active coupling section and at least one crossover section, the at least one crossover section operative when the coil assembly is located proximate a workpiece to heat at least a portion of a journal area in a recess of the workpiece, and
   a passive turn electrically isolated from the active turn and forming a second conductive circuit, the passive turn having at least one passive coupling section and at least one passive heating section, the passive turn translatable relative to the active turn between a first position in which the passive heating section clears a recess sidewall as the coil assembly is translated radially toward a recess in the workpiece and a second position in which the passive coupling section is proximate to and electromagnetically coupled with the active coupling section of the active turn and in which the passive heating section is located proximate to an undercut fillet area of the workpiece recess.

2. The apparatus of claim 1, where the active turn includes a circumferential active heating portion proximate the journal area.

3. The apparatus of claim 2, where the passive turn is translatable relative to the active turn in a direction parallel to a longitudinal axis of the workpiece between the first and second positions.

4. The apparatus of claim 2, further comprising an insulator disposed between the passive coupling section and the active coupling section.

5. The apparatus of claim 1, where the passive heating section of the passive turn is translatable in a direction away from the active turn from the first position to the second position.

6. The apparatus of claim 1, where the active turn comprises first and second active coupling sections joined by first and second axially extending crossover sections, the crossover sections operative when the coil assembly is located proximate the workpiece to heat at least a portion of a journal area; and where the apparatus comprises:
    a first passive turn electrically isolated from the active turn and forming a first passive conductive circuit, the first passive turn having at least one passive coupling section and at least one passive heating section, the first passive turn translatable relative to the active turn between a first position in which the first passive heating section clears a first recess sidewall as the coil assembly is translated radially toward the recess in the workpiece and a second position in which the first passive coupling section is proximate to and electromagnetically coupled with the first active coupling section of the active turn and in which the first passive heating section is located at least partially within a first undercut fillet area of the workpiece recess, and
    a second passive turn electrically isolated from the active turn and forming a second passive conductive circuit, the second passive turn having at least one passive coupling section and at least one passive heating section, the second passive turn translatable relative to the active turn between a first position in which the second passive heating section clears a second recess sidewall as the coil assembly is translated radially toward the recess in the workpiece and a second position in which the second passive coupling section is proximate to and electromagnetically coupled with the second active coupling section of the active turn and in which the second passive heating section is located at east partially within a second undercut fillet area of the workpiece recess.

7. The apparatus of claim 6, where the first passive turn is translatable relative to the active turn in a first direction generally parallel to a longitudinal axis of the workpiece between the first and second positions of the first passive turn, and where the second passive turn is translatable relative to the active turn in a second direction generally parallel to the longitudinal axis of the workpiece between the first and second positions of the second passive turn.

8. The apparatus of claim 6, further comprising a first insulator disposed between the first passive coupling section and the first active coupling section, and a second insulator disposed between the second passive coupling section and the second active coupling section.

9. The apparatus of claim 5, where the passive heating section of the passive turn is translatable relative to the active turn in a direction parallel to a longitudinal axis of the crossover section of the active turn between the first and second positions.

10. The apparatus of claim 1, where the passive turn is translatable relative to the active turn in a direction parallel to a longitudinal axis of the workpiece between the first and second positions.

11. The apparatus of claim 10, further comprising an insulator disposed between the passive coupling section and the active coupling section.

12. The apparatus of claim 10, where the passive heating section of the passive turn is translatable in a direction away from the active turn from the first position to the second position.

13. The apparatus of claim 1, further comprising an insulator disposed between the passive coupling section and the active coupling section.

14. The apparatus of claim 1, where the passive heating section of the passive turn is translatable relative to the active turn in a direction parallel to a longitudinal axis of the crossover section of the active turn between the first and second positions.

15. An induction coil apparatus for hardening a workpiece, the apparatus comprising:
    a coil assembly comprising:
        at least one active turn coupleable to an electric power source to form a first conductive circuit, the active turn having at least one active coupling section, and
        a passive turn electrically isolated from the active turn and forming a second conductive circuit, the passive turn having at least one passive coupling section and at least one passive heating section, the passive turn being translatable relative to the active turn between a first position and a second position in which the passive coupling section is electromagnetically coupled with the active coupling section of the active turn.

16. The apparatus of claim 15, where the passive turn is translatable relative to the active turn in a direction parallel to a longitudinal axis of the workpiece between the first and second positions.

17. The apparatus of claim 15, further comprising an insulator disposed between the passive coupling section and the active coupling section.

18. The apparatus of claim 15, comprising:
    a first passive turn electrically isolated from the active turn and forming a first passive conductive circuit, the first passive turn having at least one passive coupling section and at least one passive heating section, the first passive turn being translatable relative to the active turn between a first position and a second position in which the first passive coupling section is electromagnetically coupled with a first active coupling section of the active turn; and
    a second passive turn electrically isolated from the active turn and forming a second passive conductive circuit, the second passive turn having at least one passive coupling section and at least one passive heating section, the second passive turn being translatable relative to the active turn between a first position and a second position in which the second passive coupling section is electromagnetically coupled with a second active coupling section of the active turn.

19. An induction coil apparatus for hardening a recessed portion of a workpiece, the apparatus comprising:
    a coil assembly comprising:
        a first turn, comprising
            first and second conductive couplings for connection to an electric power source, and at least one active coupling section, and
a second turn electrically isolated from the first turn and forming a conductive circuit, the second turn comprising:
at least one passive coupling section, and
at least one passive heating section,
wherein the second turn is translatable relative to the first turn between a first position and a second position in which the at least one passive coupling section is electromagnetically coupled with the active coupling section of the first turn and in which the at least one passive heating section is located proximate to a recessed portion of the workpiece.

20. The apparatus of claim 19, wherein the first turn comprises at least one active heating section operative when the coil assembly is located proximate the workpiece to heat at least a portion of the workpiece.

* * * * *